(12) United States Patent
Marti et al.

(10) Patent No.: US 10,915,175 B2
(45) Date of Patent: Feb. 9, 2021

(54) HAPTIC NOTIFICATION SYSTEM FOR VEHICLES

(71) Applicant: HARMAN INTERNATIONAL INDUSTRIES, INCORPORATED, Stamford, CT (US)

(72) Inventors: Stefan Marti, Oakland, CA (US); Davide Di Censo, Sunnyvale, CA (US); Joseph Verbeke, Mountain View, CA (US); Adam Boulanger, Palo Alto, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/319,319

(22) PCT Filed: Jul. 21, 2017

(86) PCT No.: PCT/US2017/043238
§ 371 (c)(1),
(2) Date: Jan. 18, 2019

(87) PCT Pub. No.: WO2018/017932
PCT Pub. Date: Jan. 25, 2018

(65) Prior Publication Data
US 2019/0276051 A1 Sep. 12, 2019

Related U.S. Application Data

(60) Provisional application No. 62/365,960, filed on Jul. 22, 2016.

(51) Int. Cl.
G06F 3/01 (2006.01)
H04R 1/46 (2006.01)
(Continued)

(52) U.S. Cl.
CPC .............. *G06F 3/016* (2013.01); *B60K 37/06* (2013.01); *B60Q 9/00* (2013.01); *B60W 50/16* (2013.01);
(Continued)

(58) Field of Classification Search
CPC ...... G06F 3/016; G06F 3/0414; G06F 3/0488; G06F 9/3004; G06F 2203/014;
(Continued)

(56) References Cited

U.S. PATENT DOCUMENTS 6,338,028 B1  1/2002 Shelton et al.
7,560,826 B2 * 7/2009 Hijikata ............... B60N 2/0232
                                                      307/9.1
(Continued)

OTHER PUBLICATIONS

International Search Report for Application No. PCT/US2017/043238, dated Oct. 2, 2017, 7 pages.
(Continued)

Primary Examiner — Nay Tun
(74) Attorney, Agent, or Firm — Artegis Law Group, LLP

(57) ABSTRACT

One embodiment of the present disclosure sets forth a technique for directing a user to modify an aspect of a vehicle via haptic output. The technique includes identifying one or more characteristics of a real-world condition located along a route of a vehicle. The technique further includes determining, based on the one or more characteristics of the real-world condition, a type of haptic sensation to deliver to a user associated with the vehicle. The technique further includes transmitting a first set of controls signals to at least one haptic output device that is proximate to the user, where the at least one haptic output device generates, based on the first set of control signals, haptic output corresponding to they type of haptic sensation.

20 Claims, 7 Drawing Sheets

(51) Int. Cl.
| | |
|---|---|
| *B60Q 9/00* | (2006.01) |
| *B60W 50/16* | (2020.01) |
| *G06F 9/30* | (2018.01) |
| *B60K 37/06* | (2006.01) |
| *G06F 3/041* | (2006.01) |
| *G06F 3/0488* | (2013.01) |

(52) U.S. Cl.
CPC .......... *G06F 3/0414* (2013.01); *G06F 3/0488* (2013.01); *G06F 9/3004* (2013.01); *H04R 1/46* (2013.01); *B60W 2552/00* (2020.02); *B60W 2554/00* (2020.02); *B60W 2555/20* (2020.02); *G06F 2203/014* (2013.01); *H04R 2460/13* (2013.01)

(58) Field of Classification Search
CPC ......... B60K 37/06; B60Q 9/00; B60W 50/16; B60W 2550/12; B60W 2550/14; B60W 2550/20; H04R 1/46; H04R 2460/13
See application file for complete search history.

(56) References Cited

U.S. PATENT DOCUMENTS

| | | | | |
|---|---|---|---|---|
| 8,547,215 | B2* | 10/2013 | Sanma | B62D 1/046 340/438 |
| 8,581,714 | B2* | 11/2013 | Yu | B60T 8/17557 340/435 |
| 8,845,110 | B1 | 9/2014 | Worley, III | |
| 8,970,358 | B2 | 3/2015 | Kiefer et al. | |
| 9,002,020 | B1 | 4/2015 | Kim et al. | |
| 9,081,651 | B2 | 7/2015 | Filev et al. | |
| 9,290,174 | B1 | 3/2016 | Zagorski | |
| 9,317,119 | B2 | 4/2016 | Hirose et al. | |
| 9,656,606 | B1* | 5/2017 | Vose | B60Q 9/008 |
| 9,718,400 | B2* | 8/2017 | Knobl | B60Q 9/00 |
| 9,827,811 | B1* | 11/2017 | McNew | G08B 6/00 |
| 9,827,904 | B2 | 11/2017 | Modarres et al. | |
| 10,191,537 | B2* | 1/2019 | Tanaka | G06F 1/1637 |
| 10,235,848 | B2* | 3/2019 | Billington | G08B 6/00 |
| 10,275,029 | B2* | 4/2019 | Jones | G06F 3/016 |
| 10,282,981 | B1* | 5/2019 | Nepomuceno | G08G 1/166 |
| 10,479,271 | B2* | 11/2019 | Hashimoto | B60R 21/00 |
| 2003/0168838 | A1 | 9/2003 | Breed et al. | |
| 2004/0049323 | A1* | 3/2004 | Tijerina | B60N 2/002 701/1 |
| 2006/0284839 | A1 | 12/2006 | Breed et al. | |
| 2007/0236450 | A1 | 10/2007 | Colgate et al. | |
| 2009/0073112 | A1* | 3/2009 | Basson | G06F 3/016 345/156 |
| 2009/0076723 | A1 | 3/2009 | Moloney | |
| 2009/0091215 | A1 | 4/2009 | Aoki et al. | |
| 2009/0250267 | A1 | 10/2009 | Heubel et al. | |
| 2009/0259372 | A1* | 10/2009 | Hijikata | B60N 2/0232 701/49 |
| 2009/0284485 | A1 | 11/2009 | Colgate et al. | |
| 2010/0013613 | A1 | 1/2010 | Weston | |
| 2010/0085168 | A1 | 4/2010 | Kyung et al. | |
| 2010/0198458 | A1 | 8/2010 | Buttolo et al. | |
| 2011/0054756 | A1* | 3/2011 | Hecker | B60T 8/00 701/70 |
| 2011/0115709 | A1 | 5/2011 | Cruz-Hernandez | |
| 2011/0310028 | A1 | 12/2011 | Camp, Jr. et al. | |
| 2012/0126965 | A1 | 5/2012 | Sanma et al. | |
| 2012/0245406 | A1 | 9/2012 | Aghamohammadi | |
| 2012/0306631 | A1 | 12/2012 | Hughes | |
| 2013/0127755 | A1 | 5/2013 | Lynn et al. | |
| 2013/0155020 | A1 | 6/2013 | Heubel et al. | |
| 2013/0222311 | A1 | 8/2013 | Pesonen | |
| 2014/0309880 | A1* | 10/2014 | Ricci | G06F 16/583 701/36 |
| 2014/0310594 | A1 | 10/2014 | Ricci et al. | |
| 2014/0318699 | A1* | 10/2014 | Longinotti-Buitoni | A61B 5/6805 156/247 |
| 2014/0320402 | A1 | 10/2014 | Stahlberg | |
| 2014/0346823 | A1 | 11/2014 | Stebbins et al. | |
| 2014/0363033 | A1 | 12/2014 | Heiman et al. | |
| 2015/0070148 | A1 | 3/2015 | Cruz-Hernandez et al. | |
| 2015/0097657 | A1 | 4/2015 | Gandhi et al. | |
| 2015/0175172 | A1 | 6/2015 | Truong | |
| 2015/0197283 | A1 | 7/2015 | Marti et al. | |
| 2015/0199950 | A1 | 7/2015 | Heiman et al. | |
| 2015/0268722 | A1 | 9/2015 | Wang et al. | |
| 2015/0268726 | A1 | 9/2015 | Saboune et al. | |
| 2015/0293592 | A1 | 10/2015 | Cheong | |
| 2015/0306312 | A1* | 10/2015 | Palerm | A61M 5/14244 604/504 |
| 2015/0307105 | A1* | 10/2015 | Huber | B60W 40/08 340/576 |
| 2015/0314681 | A1* | 11/2015 | Riley, Sr. | A61B 5/18 340/576 |
| 2016/0004309 | A1 | 1/2016 | Modarres et al. | |
| 2016/0009175 | A1* | 1/2016 | McNew | G01C 21/3652 340/438 |
| 2016/0107570 | A1* | 4/2016 | Modarres | B60Q 9/008 340/435 |
| 2016/0187979 | A1 | 6/2016 | Nahman et al. | |
| 2016/0187982 | A1 | 6/2016 | Ciesla et al. | |
| 2016/0207454 | A1 | 7/2016 | Cuddihy et al. | |
| 2016/0217778 | A1 | 7/2016 | Iermenko | |
| 2016/0259480 | A1 | 9/2016 | Augenbergs et al. | |
| 2017/0021762 | A1* | 1/2017 | Daman | B60Q 9/00 |
| 2017/0169673 | A1* | 6/2017 | Billington | G08B 6/00 |
| 2017/0249810 | A1* | 8/2017 | Zerick | A41D 1/002 |
| 2017/0262164 | A1* | 9/2017 | Jain | G06F 8/38 |
| 2017/0336903 | A1 | 11/2017 | Rivaud et al. | |
| 2018/0326902 | A1* | 11/2018 | Hashimoto | H04R 1/00 |
| 2019/0047591 | A1* | 2/2019 | Augst | B60W 30/18145 |
| 2019/0122525 | A1* | 4/2019 | Lancelle | G08B 21/06 |

OTHER PUBLICATIONS

Non-Final Office Action for U.S. Appl. No. 16/319,331 dated Jan. 10, 2020, 18 pages.
Non-Final Rejection received for U.S. Appl. No. 16/319,330, dated Mar. 4, 2020, 50 pages.
Extended European Search Report for application No. 17831480.3 dated Nov. 21, 2019, 7 pages.
International Search Report for application No. PCT/US2017/037619 dated Sep. 27, 2017, 7 pages.
Non-Final Rejection received for U.S. Appl. No. 16/319,316, dated Aug. 14, 2019, 20 pages.
Notice of Allowance received for U.S. Appl. No. 16/319,316, dated Dec. 13, 2019, 14 pages.
Extended European Search Report for application No. 17831478.7 dated Nov. 21, 2019, 7 pages.
International Search Report for application No. PCT/US2017/037593 dated Sep. 7, 2017, 7 pages.
Non-Final Rejection received for U.S. Appl. No. 16/319,331, dated Jan. 10, 2020, 24 pages.
Extended European Search Report for application No. 17831936.4 dated Nov. 22, 2019, 7 pages.
Extended European Search Report for application No. 17831937.2 dated Nov. 26, 2019, 8 pages.
International Search Report for application No. PCT/US2017/043240 dated Sep. 29, 2017, 9 pages.
Extended European Search Report for application No. 17831989.3 dated Nov. 29, 2019, 8 pages.
International Search Report for application No. PCT/US2017/043374 dated Oct. 6, 2017, 14 pages.
Non-Final Rejection received for U.S. Appl. No. 16/319,332, dated Nov. 27, 2019, 28 pages.
Extended European Search Report for application No. 17831938.0 dated Dec. 6, 2019, 7 pages.
International Search Report for application No. PCT/US2017/043242 dated Sep. 29, 2017, 9 pages.
Final Office Action for U.S. Appl. No. 16/319,331, dated Jun. 15, 2020, 15 pages.

(56) References Cited

OTHER PUBLICATIONS

Final Office Action for U.S. Appl. No. 16/319,332, dated May 15, 2020, 16 pages.
Final Rejection received for U.S. Appl. No. 16/319,330, dated Sep. 10, 2020, 40 pages.
Non-Final Rejection received for U.S. Appl. No. 16/319,333, dated Sep. 17, 2020, 53 pages.
Non-Final Office Action received for U.S. Appl. No. 16/319,332, dated Aug. 18, 2020, 19 pages.

* cited by examiner

HAPTIC NOTIFICATION SYSTEM FOR VEHICLES

CROSS-REFERENCE TO RELATED APPLICATIONS

The present application is a national stage application of the international application titled, "HAPTIC NOTIFICATION SYSTEM FOR VEHICLES," filed on Jul. 21, 2017 and having application number PCT/US2017/043238, which claims the priority benefit of the United States Provisional Patent Application titled, "VEHICLE INTERFACE SYSTEMS," filed on Jul. 22, 2016 and having Ser. No. 62/365,960. The subject matter of these related applications is hereby incorporated herein by reference.

BACKGROUND

Field of the Embodiments

The various embodiments relate generally to human-machine interfaces and, more specifically, to a haptic notification system for vehicles.

Description of the Related Art

Modern vehicles are increasingly networked with data sources that are outside of the vehicle (e.g., cloud-based data sources). Such data sources may provide information about road conditions, weather patterns, and traffic behavior to a control unit operating within the vehicle (e.g., an in-vehicle infotainment system). For example, a driver could upload a route along which he or she plans to drive. In response, a control unit analyzes road conditions, weather patterns, and/or traffic behavior and determines whether the driver would experience adverse driving conditions along the route. In addition, vehicles may be equipped with sensors to detect various road conditions that may be occluded from the driver's view by other vehicles around the driver. For example, sensors could generate sensor data that, when analyzed by a control unit of a vehicle, indicates the position, size, and depth of a pothole in the road. The control unit could also determine whether the vehicle would drive into the pothole if the driver maintains the current steering direction and rate of acceleration.

Conventionally, when a control unit determines that the vehicle may enter an area with adverse road conditions, weather patterns, and/or traffic behavior, the control unit provides a visual or auditory notification to the driver. For example, the control unit could display an image on the vehicle display that indicates the type of adverse condition that the driver is likely to encounter if she continues to drive along the present route. In addition, the control unit could also generate an alert tone when the driver is likely to encounter adverse driving conditions.

One downside of the approaches described above is that, when the user is driving, looking at visual notifications and listening to auditory notifications can divert the driver's attention. For example, visual and/or auditory notifications may not clearly indicate to the driver the action(s) that should be taken in a given situation. As a result, interpreting visual and auditory notifications can increase the cognitive workload on a driver and may require the driver to look away from the road while driving.

As the foregoing illustrates, techniques for more effectively communicating with drivers would be useful.

SUMMARY

Embodiments of the present disclosure set forth a method for directing a user to modify an aspect of a vehicle via haptic output. The method includes identifying one or more characteristics of a real-world condition located along a route of a vehicle. The method further includes determining, based on the one or more characteristics of the real-world condition, a type of haptic sensation to deliver to a user associated with the vehicle. The method also includes transmitting one or more control signals to at least one haptic output device that is proximate to the user. The haptic output device(s) generate, based on the control signal(s), haptic output corresponding to the type of haptic sensation.

Further embodiments provide, among other things, a system and a non-transitory computer-readable storage medium configured to implement the techniques set forth above.

At least one advantage of the techniques described herein is that a user can receive a notification about a real-world condition without looking at a visual display or listening to an audio alert. Accordingly, a user (e.g. a driver) can anticipate various types of real-world conditions without diverting his or her gaze from the road. Furthermore, haptic sensations can be implemented as an alternative means for communicating with the user, preventing the user's visual and auditory senses from being overwhelmed with additional information. As a result, the techniques described herein reduce the cognitive workload placed on a user when various types of information are provided to the user.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

DETAILED DESCRIPTION

Figure 1:
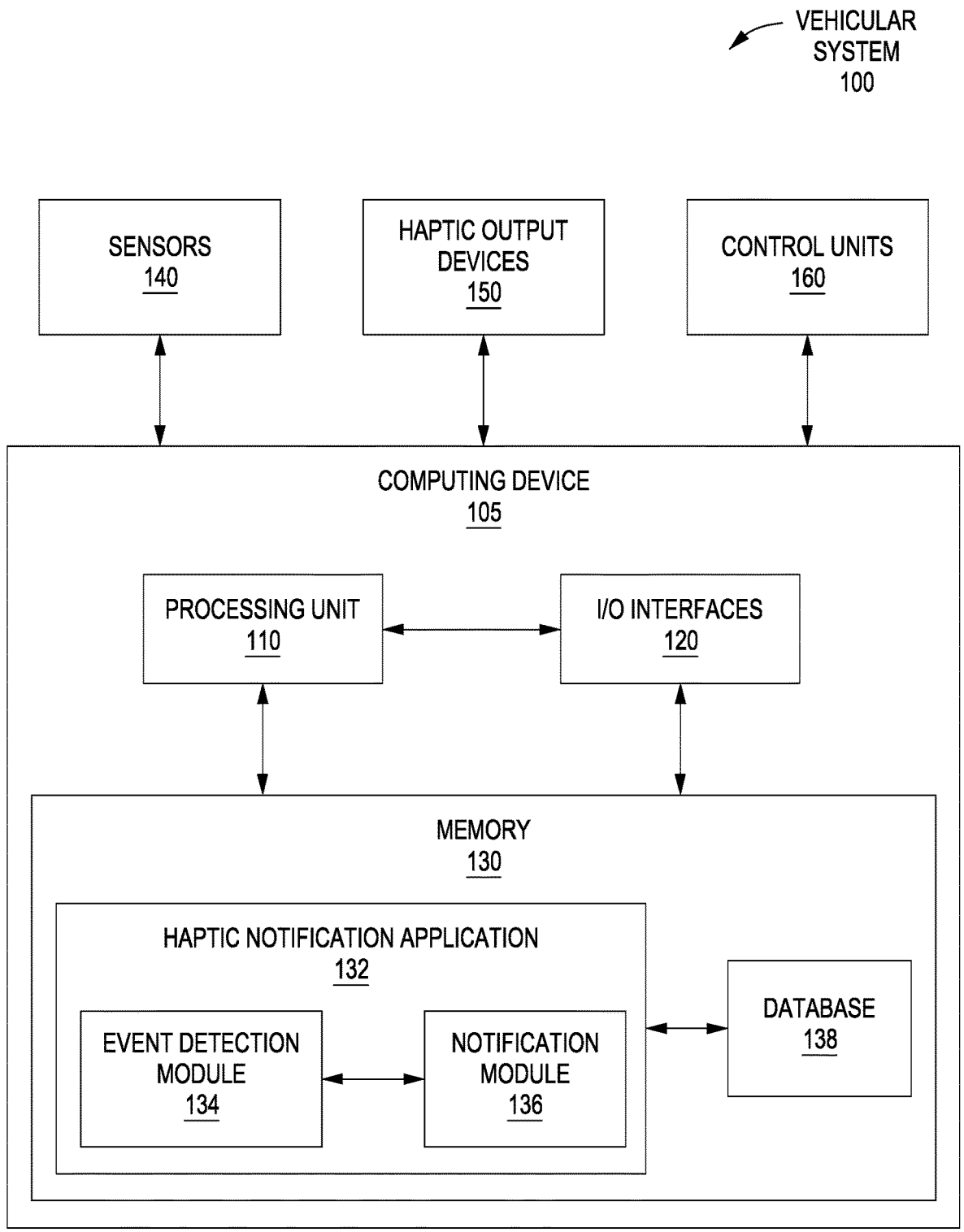
FIG. 1 illustrates a block diagram of a system configured to implement one or more aspects of the present disclosure, according to various embodiments.

FIG. 1 illustrates a block diagram of a vehicular system 100 configured to implement one or more aspects of the present disclosure, according to various embodiments. As shown, vehicular system 100 includes a computing device 105, sensors 140, haptic output devices 150, and control units 160. In operation, computing device 105 receives input data corresponding to real-world conditions from sensors 140 and/or control units 160 and processes the input data to generate notifications related to the real-world conditions. Computing device 105 configures haptic output devices 150 to deliver the notifications to a user of vehicular system 100.

Sensors 140 may include visual sensors (e.g., an RGB image sensor), time-of-flight sensors (e.g., depth cameras), thermal sensors, radar based sensors (e.g., short range and long range sensors), laser based sensors (e.g., LIDAR), ultrasound based sensors, microwave based sensors, external cameras, driver facing cameras, global navigation satellite systems (GNSS), speedometer, tachometer, telemetry sensors, external network connections, gyroscopes, barometers, fuel-level sensors, tire pressure sensors, and so forth. Sensors 140 are configured to generate sensor data indicative of one or more characteristics of the environment external to the vehicular system 100 and one or more characteristics of the environment internal to the vehicular system 100. Sensors 140 transmit the generated sensor data to computing device 105. Sensors 140 may transmit the data via a controller area network, a local interconnect network, a FlexRay®, and so forth.

With respect to the environment external to vehicular system 100, sensors 140 generate sensor data indicative of one or more real-world conditions external to the vehicular system 100. For example, sensors 140 generate sensor data corresponding to the intensity of light reflected from a driving surface. The pattern of the intensities of the reflected light may be indicative of a deformation in the driving surface, such as a pothole. In one embodiment, sensors 140 generate sensor data corresponding to the state of vehicular system 100. For example, sensors 140 detect the magnitude and direction of the acceleration of the vehicular system 100. The pattern of a large downward acceleration followed in quick succession by a large upwards acceleration may denote that the vehicular system 100 drove into a pothole in the road.

With respect to the environment internal to the vehicular system 100, sensors 140 generate sensor data corresponding to the location of the user of the vehicular system 100. Such sensor data may be indicative of the position and/or orientation of the user and/or the size of the user. In various embodiments, sensors 140 generate data indicative of positional information associated with a particular part of the user, such as the user's hand, leg, forearm, wrist, palm, neck, trunk, etc.

Control units 160 may include telemetry control units, in-vehicle infotainment systems, and/or other systems of a vehicle that interact with data sources and/or data repositories that are external to the vehicle. In various embodiments, control units 160 are configured to receive data indicative of a real-world condition located along the route of vehicular system 100. For example, control units 160 could determine, based on data received from a weather station, that a cold front is generating icy road conditions along the route of vehicular system 100. In some embodiments, control units 160 generate a notification indicative of the type of hazard that the vehicle could encounter. In response, control units 160 transmit the notification to computing device 105 in order to notify a user of the computing device 105.

Haptic output devices 150 may include ultrasound transducers, air vortex generators, pneumatic devices, air bladders, and/or any type of device configured to generate haptic output. In various embodiments, haptic output devices 150 receive one or more control signals from computing device 105 that indicate how one or more parameters of the haptic output devices 150 should be configured. These parameters include the intensity of the haptic output. For ultrasonic output devices, notification module 136 may also modify the phase of the haptic output in order to control the directionality of the haptic output. For air output devices, notification module 136 may also control one or more parameters of a pan-tilt actuation regime in order to generate air output in one or more directions. Based on the control signal(s), haptic output devices 150 generate haptic output corresponding to a particular haptic sensation on a user. For example, haptic output devices 150 could generate haptic output with a certain frequency, phase, intensity, etc. The result of such haptic output is a haptic sensation generated on a particular part of the user that has a certain size, intensity, shape, orientation, and so forth. In addition, haptic output devices 150 may generate haptic sensations on a user that follow a user's movements and/or that move in a particular manner relative to the position of the user and/or the manner in which the user is moving. Furthermore, haptic output devices 150 may generate feedback data in conjunction with generating haptic output, the feedback data indicative of the type of haptic sensation generated. Haptic output devices 150 may transmit the feedback data to computing device 105.

Computing device 105 includes, without limitation, processing unit 110, input/output (I/O) interfaces 120, and memory 130. Computing device 105 as a whole may be a microprocessor, an application-specific integrated circuit (ASIC), a system-on-a-chip (SoC) and so forth. As shown, computing device 105 may be independent of control units 160. In alternative embodiments, computing device 105 may be embedded in control units 160 and/or may share one or more processing units, I/O interfaces, and/or memory devices (e.g., a database) with control units 160. As noted above, in various embodiments, computing device 105 receives data from sensors 140, control units 160, and/or haptic output devices 150. Furthermore, computing device 105 may transmit control signals and/or data to any or all of sensors 140, control unit 160, and haptic output devices 150. For example, computing device 105 could generate control signals to activate one or more of sensors 140 and/or could initiate data transfer from sensors 140 and/or control units 160. Moreover, computing device 105 could generate control signals to configure haptic output devices 150 to deliver a particular type of haptic sensation on a user.

Input/output (I/O) interfaces 120 may include one or more interfaces that coordinate the transfer of data, control signals, and notifications between sensors 140, haptic output devices 150, control units 160, and processing unit 110. In addition, I/O interfaces 120 may coordinate the receipt of data from data repositories, sensors, and notification systems external to the vehicle, including, without limitation, data from collective databases (e.g., crowdsourced data about traffic and road conditions), data from remote databases (e.g., traffic and weather databases), data from remote servers that accumulate various types of data (e.g., historic geocoded accident rates and historic geocoded cognitive workload levels), and so forth.

Processing unit 110 may include a central processing unit (CPU), digital signal processing unit (DSP), a sensor processing unit, a controller unit, and so forth. Processing unit 110 may be physically embedded into vehicular system 100, may be part of a cloud-based computing environment, and/or may be physically introduced into vehicular system 100 by a user, such as in a mobile or wearable device. In some embodiments, processing unit 110 may be an element of control units 160, such as a microprocessor within an in-vehicle infotainment system or a driver assistance system. In various embodiments, processing unit 110 is configured to execute applications included in memory 130.

Memory 130 includes a haptic notification application 132 configured to communicate with database 138. Processing unit 110 executes haptic notification application 132 to implement the overall functionality of computing device 105. In a manner that is similar to processing unit 110, memory device 130 may be embedded in control units 160 or introduced into vehicular system 100 by a user. Moreover, memory device 130 may be included in a cloud-based computing environment.

Database 138 may store various types of data including, user preferences data (e.g., the part of the user on which to generate haptic sensations), various pre-set configurations for one or more of sensors 140 and haptic output devices 150, configurations set by the user, and so forth. For example, the database 138 could store a user configuration of the haptic output devices 150 that identifies a certain type of haptic sensation to be delivered responsive to a particular type of real-world condition. Database 138 may also store look-up tables, machine learning (ML) algorithms, etc. for analyzing data in order to identify various types of real-world conditions that may be encountered by the vehicle. In addition, database 138 may store one or more look-up tables that associate various real-world conditions with one or more types of haptic sensations that may be generated on the user. Such look-up tables may be generated by the user, pre-set into database 138, and/or generated by analyzing data reflective of one or more drivers' responses to various types of haptic sensations and real-world conditions.

In addition, data from external repositories (e.g., training datasets from driving studies and anonymized data from other vehicles) may be analyzed to determine typical driver responses to various types of haptic sensations and various types of real-world conditions. The data is processed by processing unit 110 to assist in generating and/or updating one or more look-up tables in database 138. Moreover, database 138 may store, separately or as part of the look-up table(s), various types of real-world conditions, various parameters of the user (e.g., position, orientation, movement, size, shape), a time at which to generate the sensation with respect to the amount of time that remains before the vehicle encounters the real-world condition, and the position, orientation, and types of haptic output devices that are proximate to the user.

Haptic notification application 132 includes event detection module 134 and notification module 136. Event detection module 134 analyzes data received via I/O interfaces 120 in order to determine one or more characteristics of a real-world condition that vehicular system 100 may encounter. Event detection module 134 processes the received data to generate one or more events, and transmits the corresponding event data to notification module 136. Event detection module 134 may receive sensor data from sensors 140, data from one or more external repositories (e.g., crowdsourced data about hazardous traffic and road conditions), and data from control units 160 via I/O interfaces 120.

In operation, event detection module 134 categorizes data received from various sources to determine one or more parameters of an event corresponding to one or more real-world conditions. Event detection module 134 may further access look-up tables, user preferences, configuration data, and/or processing algorithms stored in database 138 in order to categorize data. For example, event detection module 134 could scan a look-up table to determine that data indicating a deformation in the road represents a hazardous road condition, whereas data indicating the approach of a cold front along a particular segment of the vehicle route could represent a hazardous weather condition. Event detection module 134 generates event data that includes one or more parameters of an event corresponding to one or more real-world conditions. These parameters include the type, severity, and location of the real-world condition. Event detection module 134 transmits the event data to notification module 136.

Notification module 136 processes event data received from event detection module 134 and, in response, generates one or more control signals for configuring the haptic output devices 150. The haptic output devices 150, in response to the control signals, generate a particular type of haptic sensation on the user. In operation, based on the event data, notification module 136 determines whether a haptic sensation should be generated on the user. For example, notification module 136 could access database 138 to scan a look-up table to determine if a particular event is associated with any type of haptic sensation. Additionally or alternatively, notification module 136 may access vehicle pre-sets and user preferences to determine whether a certain type of haptic sensation, if any, should be generated on the user. Furthermore, notification module 136 may analyze data associated with a driver's previous driving experiences to determine the types of haptic sensations that have been used to notify a driver about a particular type of real-world condition and the driver's responses to those notifications. In addition, notification module 136 may access and analyze data from external data repositories (e.g., crowdsourced data) to determine the types of haptic sensations that are effective in causing users from various demographics to respond in a specified manner to a particular type of real-world condition. Notification module 136 may use such data to select a type of haptic sensation to generate on a user.

Notification module 136 also determines one or more parameters of the haptic sensation to generate on the user. These parameters include the time at which to generate the sensation. For example, the time could depend on the amount of time that remains before the vehicle encounters a real-world condition. These parameters also include the part of the user's body on which to generate the sensation and the shape and size of the sensation. In addition, notification module 136 analyzes sensor data received from driver-facing sensors that indicate one or more characteristics, such as position, of the user. Notification module 136 analyzes such characteristics to determine how to configure haptic output devices 150 in order to generate a specific type of haptic sensation on the user. For instance, notification 136 could determine a directionality and an intensity of the haptic output in order to generate a haptic sensation with a certain intensity on a particular part of the user.

Notification module 136 also receives the position, orientation, and type of haptic output devices 150 that are proximate to the user. In various embodiments, haptic output devices 150 may include ultrasonic transducers. Ultrasonic transducers may be arranged in arrays (e.g., 4-by-4, 8-by-8, 16-by-16, etc.). Each ultrasonic transducer emits ultrasonic waves of a certain frequency, phase, and intensity. Notification module 136 configures the ultrasonic transducers in a manner such that haptic output generated by two or more ultrasonic transducers occupy a particular location in space at a particular time. When this occurs, the haptic output of each ultrasonic transducer interferes constructively and/or destructively with the haptic output of one or more other ultrasonic transducers. Notification module 136 configures ultrasonic transducers such that the constructive and/or destructive interference occurs at the location at which the haptic output reaches the user, thereby generating a specific type of haptic sensation on the user. By modifying the intensity, phase, and frequency of the haptic output of each ultrasonic transducer, notification module 136 shifts the location of intensity peaks, increases or decreases the number of intensity peaks, and/or adjusts the shape and/or magnitude of one or more intensity peaks. In this manner, notification module 136 configures ultrasonic transducers and/or haptic output devices 150 in general to generate a specific type of haptic sensation on the user.

Furthermore, if haptic output devices 150 include air output devices, such as air vortex generators, then notification module 150 may configure the air output devices to generate one or more vortices in one or more directions in order to generate a certain type of haptic sensation on the user (e.g., by using pan-tilt actuation).

Notification module 136 further analyzes sensor data to determine if the user is moving and configures haptic output device 150 to generate a sensation on the user that tracks the user's movements. In addition, notification module 136 may configure haptic output devices 150 to generate a haptic sensation that has a movement pattern and directionality that is distinct from the manner in which the user is moving. Moreover, notification module 136 may also vary one or more parameters, including the size, shape, intensity, and frequency of the haptic sensation as the vehicle approaches the real-world condition. For example, notification module 136 could generate a sensation on the user's hand that indicates that the user is approaching a traffic hazard. As the vehicle approaches the traffic hazard, the size of the sensation could become larger, the sensation could become more intense, and/or the haptic output devices 150 could generate a type of sensation that moves on the driver's hand in a manner that could indicate that the driver should decelerate the vehicle. Additionally or alternatively, notification module 136 may configure haptic output devices 150 to generate a type of haptic sensation that simulates the type of real-world condition that the vehicle could encounter. For example, notification module 136 could configure haptic output devices 150 to generate a sequence of haptic sensations that simulates a bumpy road condition.

Furthermore, sensors 140 and/or control units 160 generate feedback data about the user's response to the haptic sensation and/or one or more characteristics of the interaction between vehicle 310 and real-world condition 330, if any. For example, control units 160 could determine whether a user changed a parameter of vehicular environment 100 after haptic output devices 150 generated a haptic sensation on the user. Additionally or alternatively, sensors 140 could generate feedback data that indicates how the position and/or orientation of the vehicle changed after haptic output devices 150 generated a haptic sensation on the user. Notification module 136 analyzes feedback data and determines whether a particular type of haptic sensation was effective in notifying the user about a real-world condition. For example, if the vehicle avoided the real-world condition, notification module 136 could determine that the haptic sensation was successful in notifying the user about the real-world condition. Notification module 136 may configure haptic output devices 150 to generate a similar type of haptic sensation on the user when notifying the user of another real-world condition. However, if the vehicle quickly accelerated or decelerated and/or displayed another type of unsafe behavior, then notification module 136 could determine that the vehicle did not avoid the real-world condition. Notification module 136 may use a different type of haptic sensation when notifying the user of another real-world condition.

Moreover, notification module 136 may further analyze training datasets from driving studies and anonymized data from other vehicles to determine the types of haptic sensations that may be effective in alerting a driver about a real-world condition. In one embodiment, notification module 136 may implement ML algorithms on the training datasets and anonymized data to determine the types of haptic sensation that may be effective in notifying a user about each type of real-world condition.

Various embodiments disclosed herein are described as being implemented in a vehicle environment (e.g., vehicular environment 100). In general, the vehicle may include any type of transportation device, including, without limitation, a car, a truck, a motorbike, a boat, a submarine, a personal watercraft, a snow mobile, an airplane, a space craft, and so forth. However, the embodiments disclosed herein contemplate any technically feasible system configured to implement the functionality of the haptic output devices within any type of environment. For example, and without limitation, the techniques described herein could be implemented with a remote vehicle control system, such as a system that controls an automobile or a drone. Additionally, although various techniques are described as being performed on the hand of a user, any of the techniques disclosed herein can be used to generate haptic output on any part of a user, including the user's hands, arms, feet, ankles, fingers, finger tips, and so forth. Further, although certain techniques are described as being performed by certain types of haptic output devices (e.g., ultrasonic transducers), each technique disclosed herein may implement any type of haptic output device to generate a haptic sensation on the user. In particular, haptic output devices that generate haptic sensations on a user without making direct, physical contact with the user can be implemented in any embodiment disclosed herein.

FIGS. 2A-2D illustrate various types of haptic sensations generated by one or more haptic output devices 150 indicative of a real-world condition, according to various embodiments. As shown, interaction area 200 includes haptic sensations 210-240.

Figure 2A:
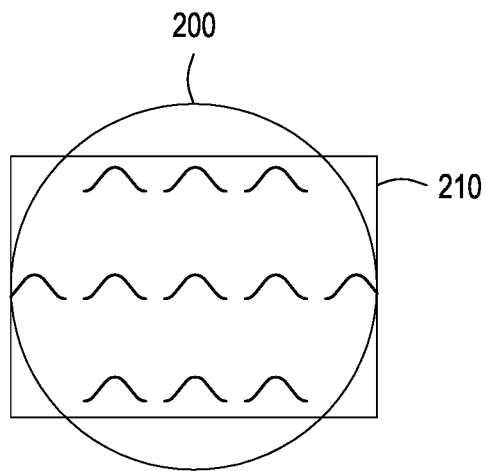
FIGS. 2A-2D illustrate various types of haptic sensations indicative of a real-world condition and generated by one or more haptic output devices, according to various embodiments.
Figure 2B:
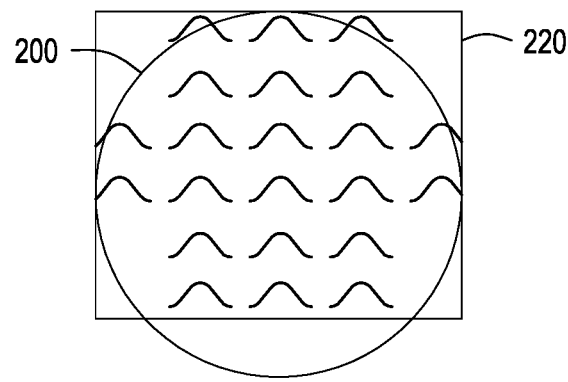

As noted above, in various embodiments, notification module 136 configures haptic output devices 150 to generate a certain type of haptic sensation at a particular part of the user. As shown in FIGS. 2A and 2B, notification module 136 may configure haptic output devices 150 to vary the intensity of a haptic sensation. In various embodiments, notification module 136 configures haptic output devices 150 to increase the intensity of a haptic sensation in an area by increasing the number and/or density of intensity peaks, increasing the amplitude of the intensity peaks, increasing density of the intensity peaks by decreasing the area spanned by the intensity peaks, and so forth. For example, notification module 136 could configure haptic output devices 150 to increase the intensity of haptic sensation 210 as the user approaches a real-world condition and/or as the real-world condition becomes more severe. In particular, haptic sensation 220 in FIG. 2B is twice as intense as haptic sensation 210 in FIG. 2A.

Figure 2C:
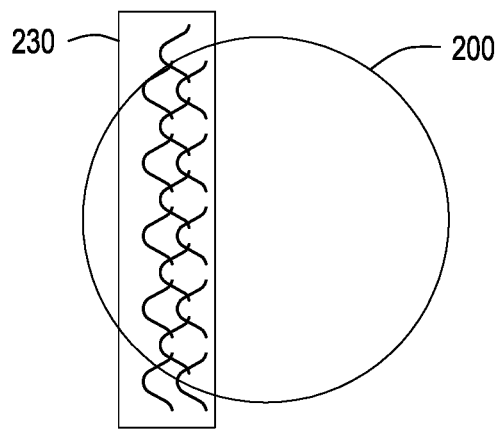
Figure 2D:
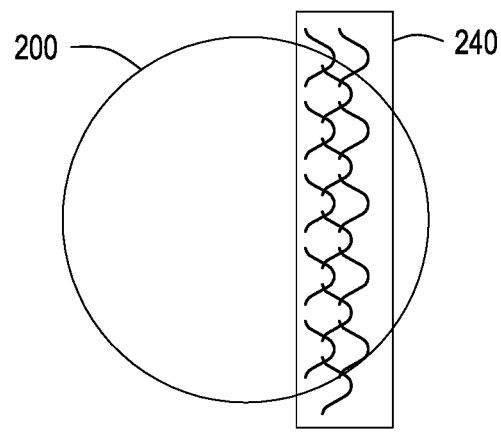

As shown in FIGS. 2C and 2D, notification module 136 may configure haptic output devices 150 to vary the position of a haptic sensation on the user. In particular, notification module 136 configures haptic output devices 150 to generate a haptic sensation that moves between the position of haptic sensation 230 in FIG. 2C and the position of haptic sensation 240 in FIG. 2D. That specific type of haptic sensation may indicate to the user that she should move a vehicle device to the right in order to modify a vehicle parameter in response to a real-world condition. Alternatively or additionally, notification module 136 may configure haptic output devices 150 to vary the position of a haptic sensation in order to indicate that the severity of a real-world condition has increased or decreased. In such embodiments, the frequency, intensity, and/or size of the haptic sensation may increase. In addition, notification module 136 may configure the haptic output devices 150 to generate a haptic sensation that moves about interaction area 200 in a periodic manner or a random manner. For example, notification module 136 may configure haptic output devices 150 to increase or decrease the frequency of the periodic motion as the user approaches or moves away from the real-world condition, respectively.

FIGS. 2A-2D also illustrate a technique in which notification module 136 varies the size and shape of a haptic sensation on a user. In particular, haptic sensation 210 and 220 are distributed regularly throughout interaction area 200. Haptic sensations 210 and 220 also fill an area of a similar size and shape. In FIGS. 2C and 2D, haptic sensations 230 and 240 are asymmetrically distributed in interaction area 200 and are in the shape of a ridge. In addition, haptic sensations 230 and 240 are concentrated in an area that is smaller in size than the area filled by haptic sensations 210 and 220. Notification module 136 may configure haptic output devices 150 to decrease the size of a haptic sensation in order to indicate to the user that the distance between the user and the real-world situation is increasing. In addition, notification module 136 may configure haptic output devices 150 to decrease the size of a haptic sensation when reducing the energy usage of haptic output devices 150.

Figure 3:
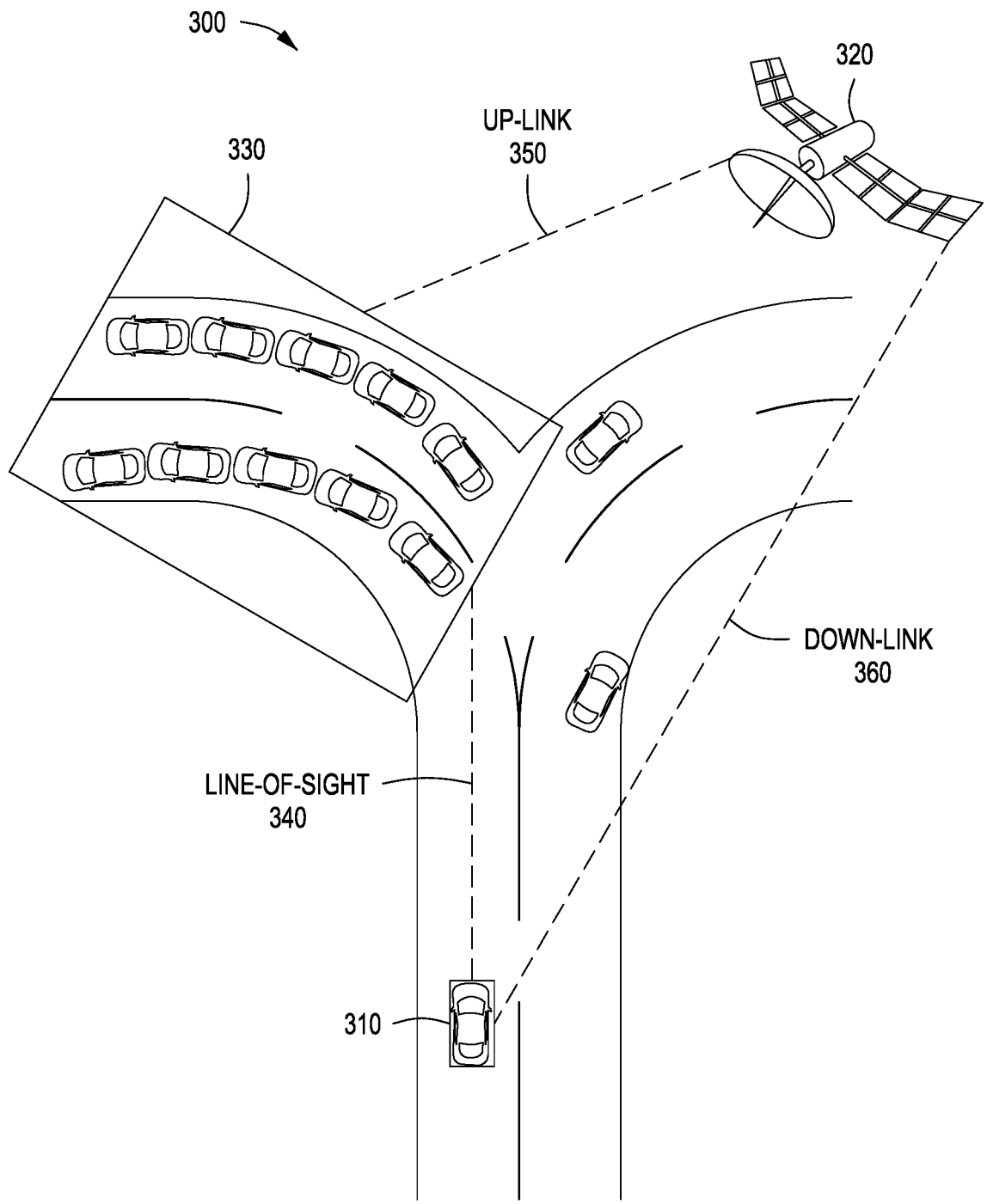
FIG. 3 illustrates a technique for detecting a real-world condition occurring along a segment of the present route of a vehicle by analyzing data from a data collection system, according to various embodiments.

FIG. 3 illustrates a technique for detecting real-world condition 330 occurring along a segment of the present route of vehicle 310 by analyzing data from data collection system 320, according to various embodiments. As shown, system environment 300 includes real-world condition 330, up-link 350, data collection system 320, down-link 360, vehicle 310, and driver line-of-sight 340. As shown, real-world condition 330 is outside of driver line-of-sight 340. Thus, the driver is unable to anticipate real-world condition 330 without receiving a notification.

In various embodiments, up-link 350 and down-link 360 may include satellite communications networks, cellphone communication networks, wireless local area networks (e.g., Wi-Fi® networks), automotive vehicle-to-everything (V2X) communication networks, various radio communication networks, and combinations of communication networks that facilitate the transfer of data between vehicle 310 and data collection system 320.

Real-world condition 330 may be any type of condition that vehicle 310 may encounter, including adverse weather conditions, adverse traffic conditions, and/or adverse road conditions. For example, real-world condition 330 could include a sharp turn, an icy patch, a stalled vehicle, an accident, a closed road, and/or heavy rain, snow or hail. Data about real-world condition 330 may be generated by sensors proximate to real-world condition 330, such as sensors in the road, around the road, in one or more vehicles proximate to real-world condition 330, and so forth. In addition, data may be generated by sensors in aerial vehicles and/or in space that monitor traffic patterns. Additionally or alternatively, one or more individuals in vehicles that are proximate to real-world condition 330 may provide data indicating the type, severity, and location of real-world condition 330.

As shown, data collection system 320 receives data about real-world condition 330 via up-link 350. Data collection system 320 may be any type of data repository that can receive data about real-world condition 330. Data collection system 320 may receive data via up-link 350, a Local Area Network, data transfer over a Wi-Fi® network, and so forth. Additionally or alternatively, data collection system 320 may include one or more sensors that generate data reflective of real-world condition 330. For example, data collection system 320 may include visual sensors (e.g., an RGB image sensor), infrared based sensors, radar based sensors, synthetic aperture radar interferometers (e.g., dual-pass or single-pass), laser based sensors (e.g., LIDAR), microwave based sensors, and so forth. In various embodiments, data collection system 320 performs one or more processing steps on the data about real-world condition 330 and transmits the data to vehicle 310 via down-link 360.

Vehicle 310 includes vehicular environment 100 discussed above. As stated above, the vehicular environment 100 is the central computing environment of vehicle 310 and includes sensors 140, haptic output devices 150, control units 160, and computing device 105. The vehicular environment 100 receives data from data collection system 320 via down-link 360, a Local Area Network, data transfer over a WiFi® network, and so forth. Data may be received by control unit 160 and/or by computing device 105. If the data is received by control units 160, then control units 160 may perform one or more processing steps on the data. For instance, control units 160 could analyze the data to determine a type, a severity, and a location of real-world condition 330. Control units 160 could also determine a notification for the user which informs the user about real-world condition 330 and indicates a parameter that the user could modify in response to real-world condition 330. In system environment 300, control units 160 could determine that vehicle 310 should move to the right lane and take the right fork in the road in response to real-world condition 330. Control units 160 could generate a notification and transmit that notification to computing device 105 via a controller area network, a local interconnect network, a FlexRay®, and so forth.

In some embodiments, computing device 105 receives data directly from data collection system 320 via down-link 360, a Local Area Network, data transfer over a WiFi® network, and so forth. The I/O interfaces 120 receive the data and transmit that data to the event detection module 134. As stated above, event detection module 134 receives notifications and/or data indicative of real-world condition 330. The event detection module 134 processes the notifications and/or data and generates event data. The event data includes a categorization of the real-world condition into a type, a severity, a location, and so forth. The event detection module 134 transmits that event data to notification module 136.

Figure 4:
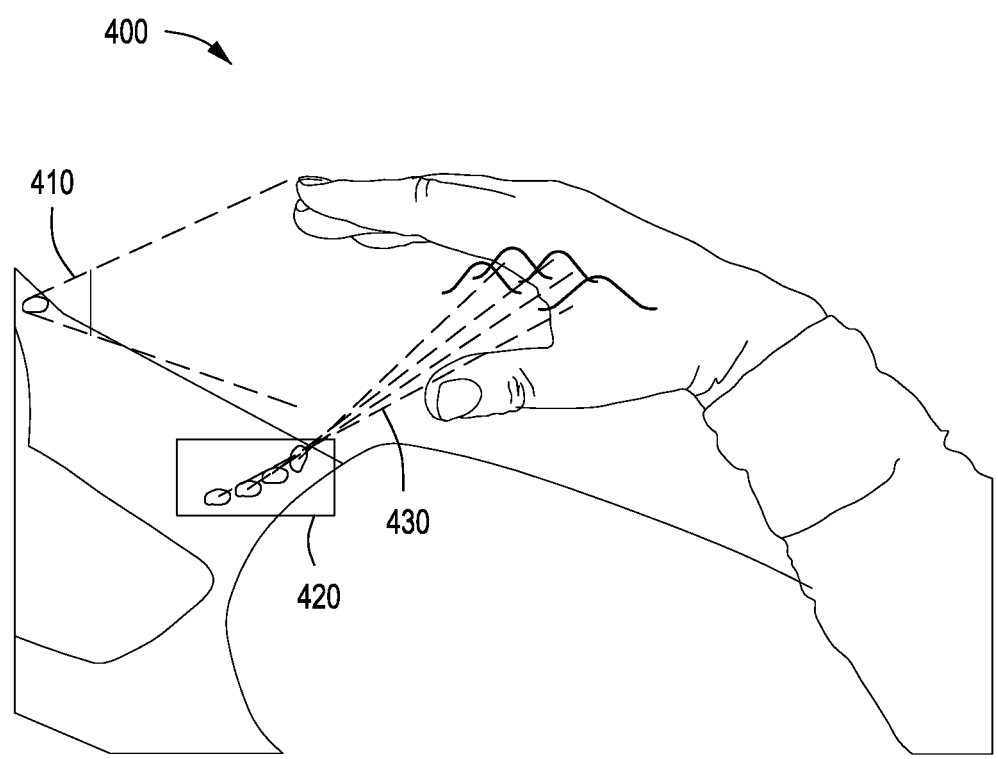
FIG. 4 illustrates a technique for generating a haptic sensation indicative of a real-world condition via one or more haptic output devices, according to various embodiments.

FIG. 4 illustrates a technique for generating a haptic sensation indicative of real-world condition 330 via haptic output devices 420, according to various embodiments. As shown, system environment 400 includes sensors 410, haptic output devices 420, and haptic output 430.

As stated above, notification module 136 receives event data from event detection module 134 that provides data about real-world condition 330. Notification module 136 analyzes sensor data from sensors 410 to determine one or more parameters of the user. For example, the sensor data could indicate the user's position, size, dimensions, orientation, how the user is moving, the part of the user that is closest to haptic output devices 420, and so forth. Notification module 136 also receives the position, orientation, and type of each of haptic output devices 430. As stated above, haptic output devices 420 include ultrasonic output devices, air output devices, and/or other types of devices that generate haptic sensations on a user.

Based on real-world condition 330, the sensor data, and haptic output devices 420, notification module 136 determines a type of haptic sensation that haptic output devices 420 should generate on the user. In particular, notification module 136 configures haptic output devices 420 to generate a haptic sensation with a particular intensity, size, position, shape, and orientation. In addition, notification module 136 determines the speed, frequency, and path along which a haptic sensation moves on the user.

Notification module 136 generates control signals for configuring haptic output devices 420. The control signals specify the intensity, phase, and/or direction of the haptic output from each of haptic output devices 420 in order to generate a particular type of haptic sensation. For example, notification module 136 could configure haptic output devices 420 to generate a complex haptic sensation on the user when there are many haptic output devices 420 and could generate a more simple haptic sensation when there are fewer haptic output devices 420. In some embodiments, notification module 136 configures haptic output devices 420 to generate a static haptic sensation when the vehicle 310 is far away from real-world condition 330. However, when the vehicle 310 is proximate to real-world condition 330, notification module 136 configures haptic output devices 420 to vary the position of the haptic sensation on the user, such that the haptic sensation oscillates in a periodic manner. Notification module 136 determines the frequency of the periodic movement. For instance, notification module 136 could configure the haptic output devices 420 to generate a haptic sensation with a frequency of oscillation that increases as the distance between real-world condition 330 and vehicle 310 decreases.

Furthermore, sensors 140 and/or control units 160 generate feedback data about the user's response to the haptic sensation and one or more characteristics of the interaction between vehicle 310 and real-world condition 330, if any. For example, in system environment 300 and system environment 400, control units 160 could determine whether the driver shifted from the left lane to the right lane. Additionally or alternatively, sensors 140 could include an accelerometer that generates data that indicates whether vehicle 310 accelerated to the right. Such acceleration could indicate that the driver changed lanes. In another embodiment, road facing sensors 140 may generate feedback data that indicates the location of vehicle 310 with respect to one or more lane markings. Furthermore, global positioning sensors may generate data that indicates that the lateral position of vehicle 310 has shifted to the right or to the left. A global navigation satellite system (GNSS) analyzes the data to determine whether vehicle 310 crossed a lane marking. The GNSS may generate feedback data that indicates whether the vehicle crossed a lane marking. The GNSS, sensors 140, and/or control units 160 transmit the feedback data to notification module 136.

Notification module 136 processes the feedback data to determine whether the haptic sensation was effective in notifying the user of real-world condition 330. For example, if vehicle 310 moved to the right lane, then notification module 136 determines that the haptic sensation was successful in modifying the user's behavior. Because the haptic sensation was successful, notification module 136 could further determine that the type of haptic sensation used to notify the user of real-world condition 330 should be implemented when notifying the user of a subsequent real-world condition. Alternatively, if vehicle 310 remained in the left lane, then notification module 136 determines that the haptic sensation was not successful in modifying the user's behavior. Because the haptic sensation was not successful, notification module 136 may further determine that a different type of haptic sensation should be implemented when notifying the user of a subsequent real-world condition. For example, notification module 136 could configure the haptic output devices 420 to increase the intensity of the haptic sensation, increase the size of the haptic sensation, and/or use a different type of haptic sensation when notifying the driver of a subsequent real-world condition.

In addition, notification module 136 may access machine learning (ML) algorithms stored in database 138 and apply those algorithms to the feedback data when processing the feedback data. Moreover, notification module 136 may further analyze training datasets from driving studies and anonymized data from other vehicles to determine the types of haptic sensations that may be effective in notifying a driver about a real-world condition.

Furthermore, in various embodiments, notification module 136 may correlate the effectiveness of a particular type of haptic sensation in notifying a user about a real-world condition to only a particular type of real-world condition. For example, notification module 136 could determine that a particular type of haptic sensation is effective at notifying the user about a traffic hazard, but is not effective at notifying the user about a hazardous road condition. In such an example, notification module 136 could generate that particular type of haptic sensation when notifying the user about a traffic hazard and could implement a different type of haptic sensation when notifying the user about a hazardous road condition.

Figure 5:
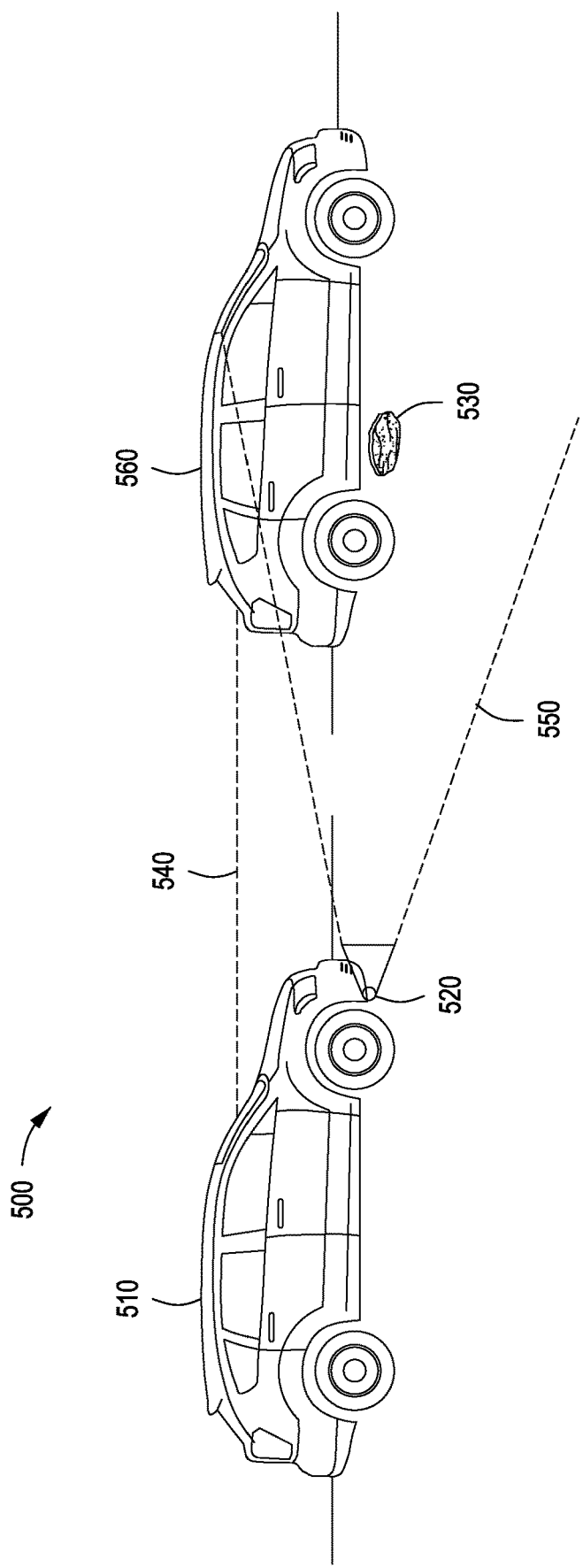
FIG. 5 illustrates a technique for detecting a real-world condition via one or more sensors, according to various embodiments.

FIG. 5 illustrates a technique for detecting real-world condition 530 via sensors 520, according to various embodiments. As shown, system environment 500 includes vehicle 510, sensor 520, real-world condition 530, sensor field-of-view 550, driver line-of-sight 540, and visual obstruction 560. Vehicle 510 includes vehicular environment 100 discussed above.

In various embodiments, real-world condition 530 may be a road condition, a traffic pattern, and/or a weather pattern. In system environment 500, real-world condition is a pothole in the road that the driver cannot see, because her line-of sight 540 is limited by visual obstruction 560. However, real-world condition 530 is within sensor field-of-view 550 of sensor 520. Sensor 520 is located within vehicular environment 100 of vehicle 510 and generates data about the real-world conditions in front of vehicle 510. Sensor 520 generates data regarding real-world condition 530 and transmits the data to computing device 105. I/O interfaces 120 within computing device 105 receive the data and transmit the data to event detection module 134. Event detection module 134 processes the data to determine one or more characteristics of real-world condition 530. Event detection module 134 generates event data that indicates the type, severity, and/or location of real-world condition 530 and transmits the event data to the notification module 136.

Figure 6:
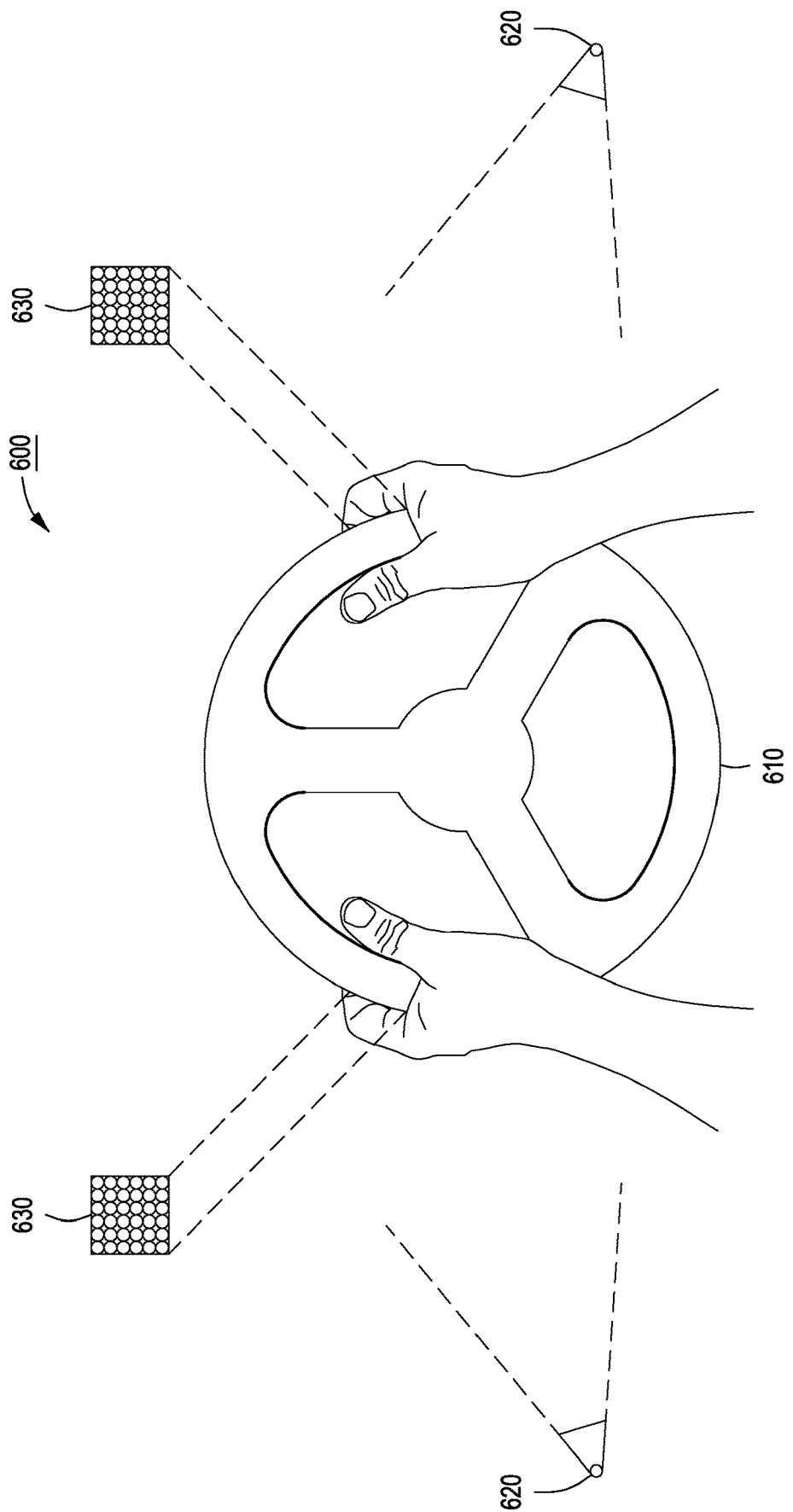
FIG. 6 illustrates a technique for generating a haptic sensation indicative of a manner in which a vehicle device should be adjusted in response to a real-world condition, according to various embodiments.

FIG. 6 illustrates a technique for generating a haptic sensation indicative of a manner in which a vehicle device should be adjusted in response to real-world condition 530, according to various embodiments. As shown, system environment 600 includes vehicle device 610, sensors 620, and haptic output devices 630.

As stated above, notification module 136 receives event data from event detection module 134. Notification module 136 processes the event data and determines a type of haptic sensation to generate on the user. Sensors 620 generate sensor data indicative of the position and/or orientation of the user's hands on steering wheel 610. In various embodiments, one or more hands may be located on or around steering wheel 610. Notification module 136 analyzes sensor data to track the position of each hand within the field-of-view of sensors 620. In various embodiments, sensors 620 may generate sensor data that reflects the position of various other parts of the user, including the user's forearm, shoulders, face, truck, and so forth. Notification module 136 analyzes the sensor data to track the position of various parts of the user's body within the field-of-view of sensor 620.

Notification module 136 selects a part of the user's body on which to generate a haptic sensation. In addition, notification module 136 selects a type of haptic sensation to generate on the user. Notification module 136 further configures haptic output devices 630 to generate haptic output with an amplitude and phase that causes the haptic output to interact with the selected part of the user's body, thereby generating the determined type of haptic sensation on the user. The type of haptic sensation indicates how the user should vary the position of vehicle device 610 in response to real-world condition 530. For instance, notification module 136 could generate a haptic sensation that moves from the left part of the driver's hand to the right part of the driver's hand. That particular haptic sensation could indicate to the driver that she should steer the vehicle to the right in order to avoid driving into a pothole.

In some embodiments, notification module 136 configures haptic output devices 630 to generate haptic sensations that provide a haptic representation of real-world condition 530. For instance, notification module 136 could generate a sequence of haptic sensations on the user's hand that change position frequently in order to indicate to the user that the particular segment of the road that she is about to drive over has many small ruts. Notification module 136 could then configure haptic output devices 630 to generate a second haptic sensation on the user's hand that indicates to the user that she should decelerate.

In addition, notification module 136 may analyze data in database 138 and/or an external data repository to determine the types of haptic sensations that are effective in notifying the driver about a specific type of real-world condition. For example, notification module 136 could access an external data repository to determine the types of haptic sensations that are effective in notifying a driver about a pothole. Notification module 136 could configure haptic output devices 630 to generate that particular type of haptic sensation on the driver's hands.

Furthermore, notification module 136 may implement a time delay in configuring the haptic output devices 630 to generate a haptic sensation on the user. Notification module 136 may set the time delay based on the current state of the vehicle, the position of the driver, and/or the amount of time that remains before vehicle 510 is likely to encounter real-world condition 530. The time delay ensures that the driver is not distracted by the haptic sensation while she may be resolving another situation with vehicle 510. For example, notification module 136 could implement a time delay before notifying a driver about a weather condition occurring at a later segment of the route, while providing notifications about potholes that are proximate to the vehicle 510.

Notification module 136 may also analyze data in database 138 to determine a threshold amount of time that the particular user and/or that users in general typically need to respond to a notification about real-world condition 530. Notification module 136 may calculate the speed of vehicle 510 to determine an expected time at which vehicle 510 would interact with real-world condition 530. Notification module 136 determines a time at which to generate the notification, such that the user has the threshold amount of time to respond to the notification before encountering real-world condition 530. Additionally or alternatively, the threshold amount of time may be pre-set and/or the user may choose a certain threshold amount of time before vehicle 510 encounters real-world condition 530 by which notification module 136 should configure haptic output devices 630 to generate a haptic sensation on the user.

Figure 7:
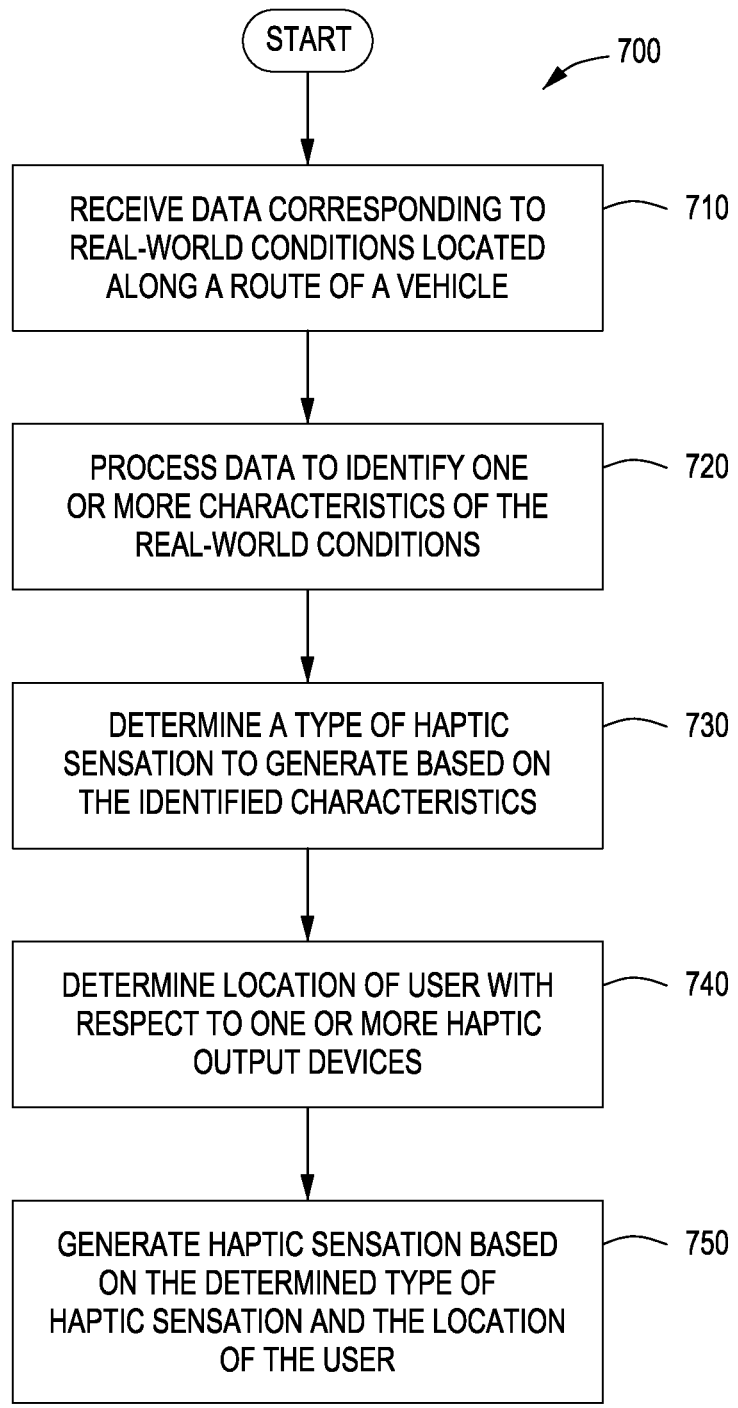
FIG. 7 illustrates a flow diagram of method steps for directing a user to modify an aspect of a vehicle via haptic output, according to various embodiments.

FIG. 7 illustrates a flow diagram of method steps for directing a user to modify an aspect of a vehicle via haptic output, according to various embodiments. Although the method steps are described in conjunction with the system of FIGS. 1-6, persons skilled in the art will understand that any system configured to perform the method steps, in any order, falls within the scope of the present disclosure.

As shown in FIG. 7, a method 700 begins at step 710, where event detection module 134 receives data corresponding to real-world conditions located along the route of the vehicle. In some embodiments, at step 710, event detection module 134 may receive data from one or more sensors located proximate to the real-world conditions, one or more sensors included in vehicular system 100, crowdsourced data, data collection system 320, and so forth. At step 720, event detection module 134 processes the data to identify one or more characteristics of the real-world conditions. The characteristics may include the location, severity, and/or type of real-world condition. For example, the real-world condition could include a traffic hazard, an adverse road condition, and/or an adverse weather pattern. The event detection module 134 transmits the characteristics of the real-world conditions to the notification module 136.

A method 700 proceeds to step 730, where the notification module 136 determines a type of haptic sensation to generate based on the identified characteristics of the real-world conditions. The notification module 136 determines the intensity, size, shape, and orientation of the haptic sensation. In addition, the notification module 136 determines whether the haptic sensation is static or whether the haptic sensation moves. For instance, the haptic sensation could oscillate about a point on the user with a particular frequency. Further, the haptic sensation could simulate one or more characteristics of the real-world condition.

The method 700 proceeds to step 740, where the notification module 136 analyzes sensor data from one or more sensors (e.g., sensor 410 and sensors 620) located proximate to the user to determine a location of the user with respect to one or more of haptic output devices 150.

The method 700 proceeds to step 750, where the notification module 136 configures the haptic output devices 150 to generate a haptic sensation based on the type of haptic sensation determined by the notification module 136 and the location of the user. When the vehicle encounters the real-world condition, the notification module 136 may implement one or more ML algorithms stored in database 138 to analyze feedback data that indicates how the vehicle interacted with the real-world condition. For instance, if the notification module 136 determined that the interaction was successful, then the notification module 136 could implement a similar type of haptic sensation when notifying the user about another real-world condition. If the notification module 136 determined that the interaction was not successful, then the notification module 136 could implement a different type of haptic sensation when notifying the user about another real-word condition. In addition, notification module 136 may further analyze training datasets from driving studies and anonymized data from other vehicles to determine the types of haptic sensations that may be effective in notifying a driver about a real-world condition.

In sum, the event detection module receives data indicative of a real-world condition along a route of a vehicle. The event detection module determines one or more characteristics of the real-world condition and transmits those characteristics to the notification module. The notification module determines a type of haptic sensation to generate on the user, based on the characteristics of the real-world condition. The notification configures the haptic output devices to generate haptic output that generates the specified type of haptic sensation on the user.

At least one advantage of the techniques described herein is that a user receives a notification about a real-world condition without requiring the user to look at a visual display or listen to an audio alert. Accordingly, a user (e.g. a driver) can anticipate various types of real-world conditions without diverting his or her gaze from the road. Furthermore, haptic sensations can be implemented as an alternative means for communicating with the user, preventing the user from being overwhelmed with additional information. As a result, the techniques described herein reduce the cognitive workload placed on a user when various types of information are provided to the user.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for directing a user to modify an aspect of a vehicle via haptic output, the method comprising:
   identifying one or more characteristics of a real-world condition located along a route of a vehicle;
   determining, based on the one or more characteristics of the real-world condition, a type of haptic sensation to deliver to a user associated with the vehicle;
   transmitting a first set of control signals to at least one haptic output device that is proximate to the user, wherein the at least one haptic output device generates, based on the first set of control signals, a first haptic output corresponding to the type of haptic sensation;
based on a user response to the first haptic output, determining an effectiveness of the type of haptic sensation with respect to the user being notified of the real-world condition located along the route of the vehicle;
based on the effectiveness of the type of haptic sensation, determining the type of haptic sensation to deliver to the user to notify the user of a second real-world condition; and
transmitting a second set of control signals to the at least one haptic output device, wherein the at least one haptic output device generates, based on the second set of control signals, a second haptic output corresponding to the type of haptic sensation.

2. The method of claim 1, wherein identifying one or more characteristics of the real-world condition comprises:
receiving input data associated with the real-world condition; and
determining one or more of a severity, a location, or a type of the real-world condition based on the input data.

3. The method of claim 2, wherein the input data includes at least one of data from sensors in the vehicle, data from sensors external to the vehicle, or crowdsourced data.

4. The method of claim 2, wherein a type of real-world condition includes one or more of an adverse road condition, an adverse weather condition, or an adverse traffic behavior.

5. The method of claim 1, wherein determining the type of haptic sensation comprises mapping at least one of the characteristics of the real-world condition to the type of haptic sensation.

6. The method of claim 5, wherein, based on the first set of control signals, the first haptic output changes position in a periodic manner.

7. The method of claim 1, wherein the type of haptic sensation is associated with one or more parameters including at least one of an intensity, a size, a shape, a movement pattern, or an orientation.

8. The method of claim 1, further comprising:
receiving, via sensor data, at least one of a position or an orientation of the user; and
determining, based on the sensor data, the type of haptic sensation to deliver to the user.

9. The method of claim 1, further comprising;
identifying one or more characteristics of a third real-world condition;
determining that the third real-world condition is similar to the real-world condition; and
transmitting a third set of controls signals to the at least one haptic output device,
wherein the at least one haptic output device generates, based on the third set of control signals, a third haptic output corresponding to a second type of haptic sensation that is similar to the type of haptic sensation based on the one or more characteristics of the real-world condition.

10. One or more non-transitory computer-readable storage media storing instructions that, when executed by one or more processors, cause the one or more processors to direct a user to modify an aspect of a vehicle via haptic output, by:
identifying one or more characteristics of a real-world condition located along a route of a vehicle;
determining, based on the one or more characteristics of the real-world condition, a type of haptic sensation to deliver to a user associated with the vehicle;
transmitting a first set of control signals to at least one haptic output device that is proximate to the user, wherein the at least one haptic output device generates, based on the first set of control signals, a first haptic output corresponding to the type of haptic sensation;
based on a user response to the first haptic output, determining an effectiveness of the type of haptic sensation with respect to the user being notified of the real-world condition located along the route of the vehicle;
based on the effectiveness of the type of haptic sensation, determining the type of haptic sensation to deliver to the user to notify the user of a second real-world condition; and
transmitting a second set of control signals to the at least one haptic output device, wherein the at least one haptic output device generates, based on the second set of control signals, a second haptic output corresponding to the type of haptic sensation.

11. The one or more non-transitory computer-readable storage media of claim 10, wherein identifying one or more characteristics of the real-world condition comprises:
receiving input data associated with the real-world condition; and
determining one or more of a severity, a location, or a type of the real-world condition based on the input data.

12. The one or more non-transitory computer-readable storage media of claim 11, wherein the input data includes at least one of data from sensors in the vehicle, data from sensors external to the vehicle, or crowdsourced data.

13. The one or more non-transitory computer-readable storage media of claim 11, wherein a type of real-world condition includes one or more of an adverse road condition, an adverse weather condition, or an adverse traffic behavior.

14. The one or more non-transitory computer-readable storage media of claim 10, wherein determining the type of haptic sensation comprises mapping at least one of the characteristics of the real-world condition to the type of haptic sensation.

15. The one or more non-transitory computer-readable storage media of claim 14, wherein, based on the first set of control signals, the first haptic output changes position in a periodic manner.

16. The one or more non-transitory computer-readable storage media of claim 10, wherein the type of haptic sensation is associated with one or more parameters including at least one of an intensity, a size, a shape, a movement pattern, or an orientation.

17. The one or more non-transitory computer-readable storage media of claim 10, wherein the instructions, when executed by the one or more processors, further cause the one or more processors to:
receive, via sensor data, at least one of a position or an orientation of the user; and
determine, based on the sensor data, the type of haptic sensation to deliver to the user.

18. The one or more non-transitory computer-readable storage media of claim 10, wherein the instructions, when executed by the one or more processors, further cause the one or more processors to:
identify one or more characteristics of a third real-world condition;
determine that the third real-world condition is similar to the real-world condition; and
transmitting a third set of controls signals to the at least one haptic output device, wherein the at least one haptic output device generates, based on the third set of control signals, a third haptic output corresponding to a second type of haptic sensation that is similar to the type of haptic sensation based on the one or more characteristics of the real-world condition.

19. A system for directing a user to modify an aspect of a vehicle via haptic output, the system comprising:
a processor that is configured to:
identify one or more characteristics of a real-world condition located along a route of a vehicle;
determine, based on the one or more characteristics of the real-world condition, a type of haptic sensation to deliver to a user associated with the vehicle;
transmit a first set of control signals to at least one haptic output device that is proximate to the user, wherein the at least one haptic output device generates, based on the first set of control signals, a first haptic output corresponding to the type of haptic sensation;
based on a user response to the first haptic output, determine an effectiveness of the type of haptic sensation with respect to the user being notified of the real-world condition located along the route of the vehicle;
based on the effectiveness of the type of haptic sensation, determine the type of haptic sensation to deliver to the user to notify the user of a second real-world condition; and
transmit a second set of control signals to the at least one haptic output device, wherein the at least one haptic output device generates, based on the second set of control signals, a second haptic output corresponding to the type of haptic sensation.

20. The system of claim 19, wherein the processor is further configured to:
identify one or more characteristics of a third real-world condition;
determine that the third real-world condition is similar to the real-world condition; and
transmit a third set of controls signals to the at least one haptic output device,
wherein the at least one haptic output device generates, based on the third set of control signals, a third haptic output corresponding to a second type of haptic sensation that is similar to the type of haptic sensation based on the one or more characteristics of the real-world condition.

* * * * *